(12) United States Patent
Caldwell et al.

(10) Patent No.: US 7,823,196 B1
(45) Date of Patent: Oct. 26, 2010

(54) METHOD AND AN APPARATUS TO PERFORM DYNAMIC SECURE RE-ROUTING OF DATA FLOWS FOR PUBLIC SERVICES

(75) Inventors: Jeffrey Bowman Caldwell, Sunnyvale, CA (US); Akbal S. Karlcut, Cupertino, CA (US); Aria Eslambolchizadeh, San Jose, CA (US)

(73) Assignee: SonicWALL, Inc., San Jose, CA (US)

( * ) Notice: Subject to any disclaimer, the term of this patent is extended or adjusted under 35 U.S.C. 154(b) by 1156 days.

(21) Appl. No.: 11/051,321

(22) Filed: Feb. 3, 2005

(51) Int. Cl.
*G06F 15/16* (2006.01)

(52) U.S. Cl. .......................................... 726/15; 370/235

(58) Field of Classification Search .................... 726/15; 370/235
See application file for complete search history.

(56) References Cited

U.S. PATENT DOCUMENTS

| | | | |
|---|---|---|---|
| 6,769,000 B1 | 7/2004 | Akhtar et al. | |
| 6,826,627 B2 | 11/2004 | Sjollema et al. | |
| 6,836,805 B1 | 12/2004 | Cook | |
| 7,181,612 B1 * | 2/2007 | Pellacuru et al. | 726/15 |
| 7,207,063 B1 * | 4/2007 | Fluhrer | 726/14 |
| 7,213,263 B2 * | 5/2007 | Makineni et al. | 726/11 |
| 7,356,841 B2 * | 4/2008 | Wilson et al. | 726/15 |
| 7,359,326 B1 * | 4/2008 | Harper et al. | 370/235 |
| 7,389,534 B1 * | 6/2008 | He | 726/15 |
| 7,398,552 B2 * | 7/2008 | Pardee et al. | 726/15 |
| 7,421,736 B2 * | 9/2008 | Mukherjee et al. | 726/15 |
| 7,565,526 B1 * | 7/2009 | Shaw et al. | 713/150 |
| 2002/0059528 A1 | 5/2002 | Dapp | |
| 2002/0184316 A1 | 12/2002 | Thomas et al. | |
| 2003/0093563 A1 | 5/2003 | Young et al. | |
| 2003/0095542 A1 | 5/2003 | Chang et al. | |
| 2003/0110273 A1 | 6/2003 | Ventura | |
| 2003/0140142 A1 | 7/2003 | Marples et al. | |
| 2003/0188001 A1 | 10/2003 | Eisenberg et al. | |
| 2004/0024879 A1 | 2/2004 | Dingman et al. | |
| 2004/0028035 A1 | 2/2004 | Read | |
| 2004/0029567 A1 | 2/2004 | Timmins et al. | |
| 2004/0073642 A1 | 4/2004 | Iyer | |
| 2004/0083290 A1 | 4/2004 | Chen et al. | |
| 2004/0128554 A1 | 7/2004 | Maher, III et al. | |
| 2004/0208175 A1 | 10/2004 | McCabe | |

(Continued)

*Primary Examiner*—Kambiz Zand
*Assistant Examiner*—Amare Tabor
(74) *Attorney, Agent, or Firm*—Blakely, Sokoloff, Taylor & Zafman LLP (57) ABSTRACT

A method and an apparatus to perform dynamic secure re-routing of data flows for public services are disclosed. In one embodiment, the method includes receiving at a first security appliance a public service message from a second security appliance via a public network. The public service message being associated with a session between the first and the second security appliances, being destined to a first network device coupled to the first security appliance, and including one of a public service request and a public service response. In response to the public service message, the method may further include determining whether a secure communication path exists between the first and the second security appliances. If the secure communication path exists between the first and the second security appliances, the method may further include re-routing the session data to the secure communication path, splitting control signals of the session from the data of the session, and using the secure communication path to transmit data of the session. Other embodiments have been claimed and described.

15 Claims, 7 Drawing Sheets

U.S. PATENT DOCUMENTS

2004/0223500 A1 11/2004 Sanderson et al.
2004/0249974 A1 12/2004 Alkhatib et al.
2004/0264439 A1 12/2004 Doherty et al.

* cited by examiner

METHOD AND AN APPARATUS TO PERFORM DYNAMIC SECURE RE-ROUTING OF DATA FLOWS FOR PUBLIC SERVICES

TECHNICAL FIELD

The present invention relates to communication using public service, and more particularly, to performing dynamic secure re-routing of data flows for public services.

BACKGROUND

In general, a public service is an application or service that is deployed in a public network and is offered to a number of different subscribers who may or may not have any relationship between them. Some public services allow for direct interaction between the subscribers. Furthermore, some public services may be characterized by the nature of a loose coupling between control signaling (which sets up data paths) and data exchange (where actual data is exchanged over the data paths). In other words, the control signals and the data may be separated from each other. A public service offers significant advantages to the subscribers because the subscribers may avoid the cost and time that would otherwise be incurred in setting up and maintaining some comparable communication services. Without public services, specialized hardware and/or software that may be required by some comparable communication services can make the set up cost substantial. Moreover, highly trained or dedicated resources that are used to maintain and manage the services on a day-to-day basis may further add to the costs when providing those services in-house. These costs may be reduced, or even avoided, by using public services.

Generally speaking, trusted service subscribers are service subscribers of the public service who have a trusted relationship between them and such trusted relationship is independent of the public service itself. For example, the trusted subscribers can be subscribers located at different remote/branch offices of the same company. As such, secure communication paths are established between these trusted service subscribers to ensure that communication between them remains private and confidential. Subscribers of the public service who are not trusted subscribers are untrusted subscribers. Currently, to communicate amongst trusted subscribers without using public services, the trusted subscribers use their private Internet Protocol (IP) addresses. When using public services, the service subscribers, both trusted and untrusted, are accessible to each other by their public IP addresses.

A public IP address is an IP address that can be used by the public service or a service subscriber to access another service subscriber. Communication using public IP address traverses a public communication path. In contrast, a private IP address is an IP address used only between trusted subscribers. The private IP address cannot be used to access an untrusted subscriber. Thus, a public service message, such as a public service request or a public service response, does not contain any private IP address. Communication using the private IP address traverses a secure communication path.

The two types of communication paths, namely, public communication paths and secure communication paths, mentioned above are defined as follows in the current document. A public communication path is a communication path used between any service subscribers of the public service, where public IP addresses are used to access the service subscribers. In contrast, a secure communication path is a communication path used by trusted service subscribers, not untrusted service subscribers. Techniques such as traffic segregation, authentication, and encryption may be employed by the secure communication path to prevent access by untrusted service subscribers. Communication over the secure communication path uses private IP addresses. One example of a secure communication path is a Virtual Private Network (VPN) tunnel. Furthermore, the secure communication path may or may not use the public communication path as its underlying transport.

Although there is substantial cost savings in using public services for communication, one major drawback of using public services is that the communication path taken when interacting with trusted subscribers is essentially no different from that used when interacting with untrusted subscribers. Typically, service subscribers that are behind a security appliance are accessible by a public IP address decided by the security appliance. A security appliance is an entity that manages both public and private IP address usages, establishes secure communication paths, and maintains the secure communication paths. When performing Network Address Translation (NAT), some conventional security appliances are responsible for choosing the public or the private IP address to indicate the source and/or destination of a message. Furthermore, some conventional security appliances are also capable of establishing secure communication paths with peer security appliances.

According to some conventional approaches, the private IP addresses of the service subscribers are not exposed or revealed by security appliances to untrusted service subscribers. When using a public service, some conventional security appliances may only use public IP addresses because the public service serves both trusted and untrusted service subscribers and the conventional security appliances may not be able to distinguish trusted subscribers from untrusted subscribers. Even if a secure communication path exists, the secure communication path is not used between trusted service subscribers when the trusted service subscribers use a public service to interact amongst themselves under some conventional approaches because communication between these trusted subscribers is accomplished using the public IP addresses of these trusted subscribers.

SUMMARY

The present invention includes a method and an apparatus to perform dynamic secure re-routing of data flows for public services. In one embodiment, the method includes receiving at a first security appliance a public service message from a second security appliance via a public network. The public service message being associated with a session between the first and the second security appliances, being destined to a first network device coupled to the first security appliance, and including one of a public service request and a public service response. In response to the public service message, the method may further include determining whether a secure communication path exists between the first and the second security appliances. If the secure communication path exists between the first and the second security appliances, the method may further include re-routing the session data to the secure communication path, splitting control signals of the session from the data of the session, and using the secure communication path to transmit data of the session.

In some embodiments, the above technique may be applied to Voice over Internet Protocol (VoIP) public service, where the first network device includes an Internet telephone, the public service network includes an Internet, and the secure communication path includes a virtual private network (VPN) tunnel.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus to perform dynamic secure re-routing of data flows for public services are described. In the following description, numerous specific details are set forth. However, it is understood that embodiments of the invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
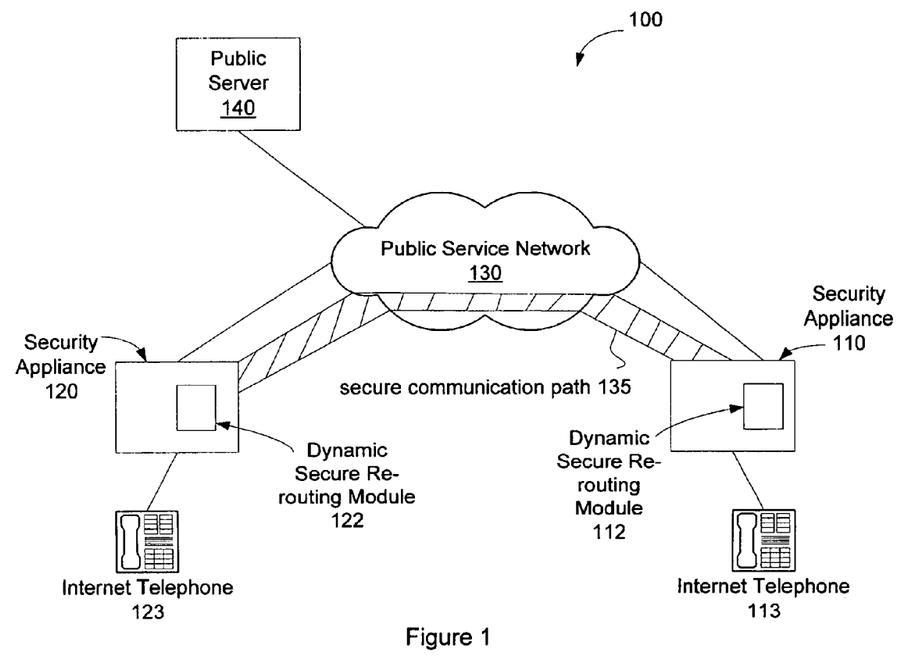
FIG. 1 illustrates a system usable with one embodiment of the invention.

FIG. 1 illustrates one embodiment of a system usable with the invention. The system 100 includes a first security appliance 110, a second security appliance 120, a public service network 130, a secure communication path 135, a first network device 113, a second network device 123, and a public server 140. The security appliances 110 and 120 are coupled to each other via the public service network 130 (e.g., the Internet). Furthermore, the security appliances 110 and 120 may also be coupled to each other via the secure communication path 135, such as a virtual private network (VPN) tunnel. The security appliances 110 and 120 are coupled to the network devices 113 and 123, respectively. The network devices are devices that can be coupled to a network (e.g., a private network, a public network, or a combination of both) to communicate with other devices via the network. Examples of the network devices 113 and 123 include Internet telephones, personal computers, personal digital assistants, workstations, etc. The public server 140 is also coupled to the public service network 130.

Note that any or all of the components and the associated hardware illustrated in FIG. 1 may be used in various embodiments of the system 100. However, it should be appreciated that other configurations of the system 100 may include more or less devices than those shown in FIG. 1.

In one embodiment, the network devices 113 and 123 communicate with each other using the public service network 130, the secure communication path 135, or a combination of both. The security appliances 110 and 120 include dynamic secure re-routing modules 112 and 122, respectively. In some embodiments, the dynamic secure re-routing modules 112 and 122 perform dynamic secure re-routing of data flows for public services to allow the network devices 113 and 123 to leverage the secure communication path 135 to communicate with each other when both network devices 113 and 123 are trusted subscribers. Details of some embodiments of the processes of dynamic secure re-routing are described below.

Figure 2:
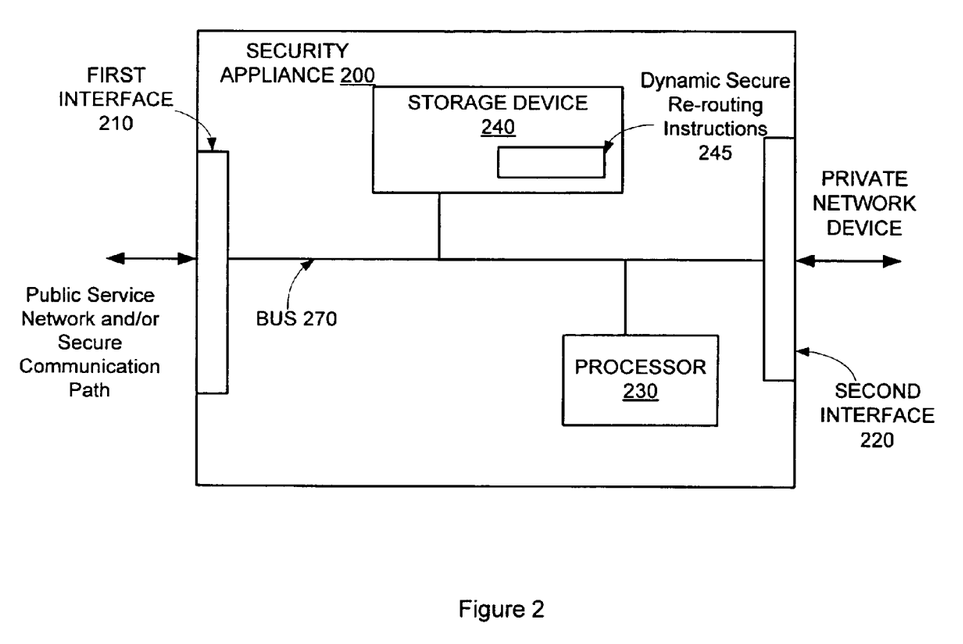
FIG. 2 illustrates one embodiment of a security appliance.

FIG. 2 shows one embodiment of a security appliance capable of performing dynamic secure re-routing of data flows for public services. The security appliance 200 includes a first interface 210, a second interface 220, a processor 230, a storage device 240, and a bus 270. The first interface 210, the second interface 220, the processor 230, and the storage device 250 are coupled to each other via the bus 270.

The security appliance 200 may be implemented in various ways. For example, the security appliance 200 may be implemented in a set-top box using dedicated circuitry and/or software. Alternatively, the security appliance 200 may be implemented in a general-purpose computing system (e.g., a personal computer, a server, etc.).

In one embodiment, the security appliance 200 is coupled to a public service network (e.g., the public service network 130 in FIG. 1) via the first interface 210. In addition to the public service network, the first interface 210 may also couple to a secure communication path (e.g., the secure communication path 135 in FIG. 1). In one embodiment, the security appliance 200 is coupled to a network device (e.g., the private network device 113 in FIG. 1) via the second interface 220. The security appliance 200 may manage public and private IP address usage for the network device. Moreover, the security appliance 200 may establish and maintain secure communication paths for the network device.

In some embodiments, the security appliance 200 includes a storage device 240. The storage device 240 may store public Internet Protocol (IP) addresses of the established secure communication paths coupled to the first interface 210 of the security appliance 200. In addition to the public IP addresses, the storage device 240 may store instructions, which when executed, causes the processor 230 to perform various operations described herein. For example, the storage device 240 may store dynamic secure re-routing instructions 245, which when executed, causes the processor 230 to perform dynamic secure re-routing.

In some embodiments, the security appliance 200 further includes a processor 230 to perform dynamic secure re-routing of data flows for public services. The processor 230 may check a first public IP address in the public service message to determine whether the first public IP address matches any of the public IP addresses in the storage device 240 during some embodiments of dynamic secure re-routing of data flows.

Details of some embodiments of the process to perform dynamic secure re-routing of data flows for public services are described below.

Figure 3A:
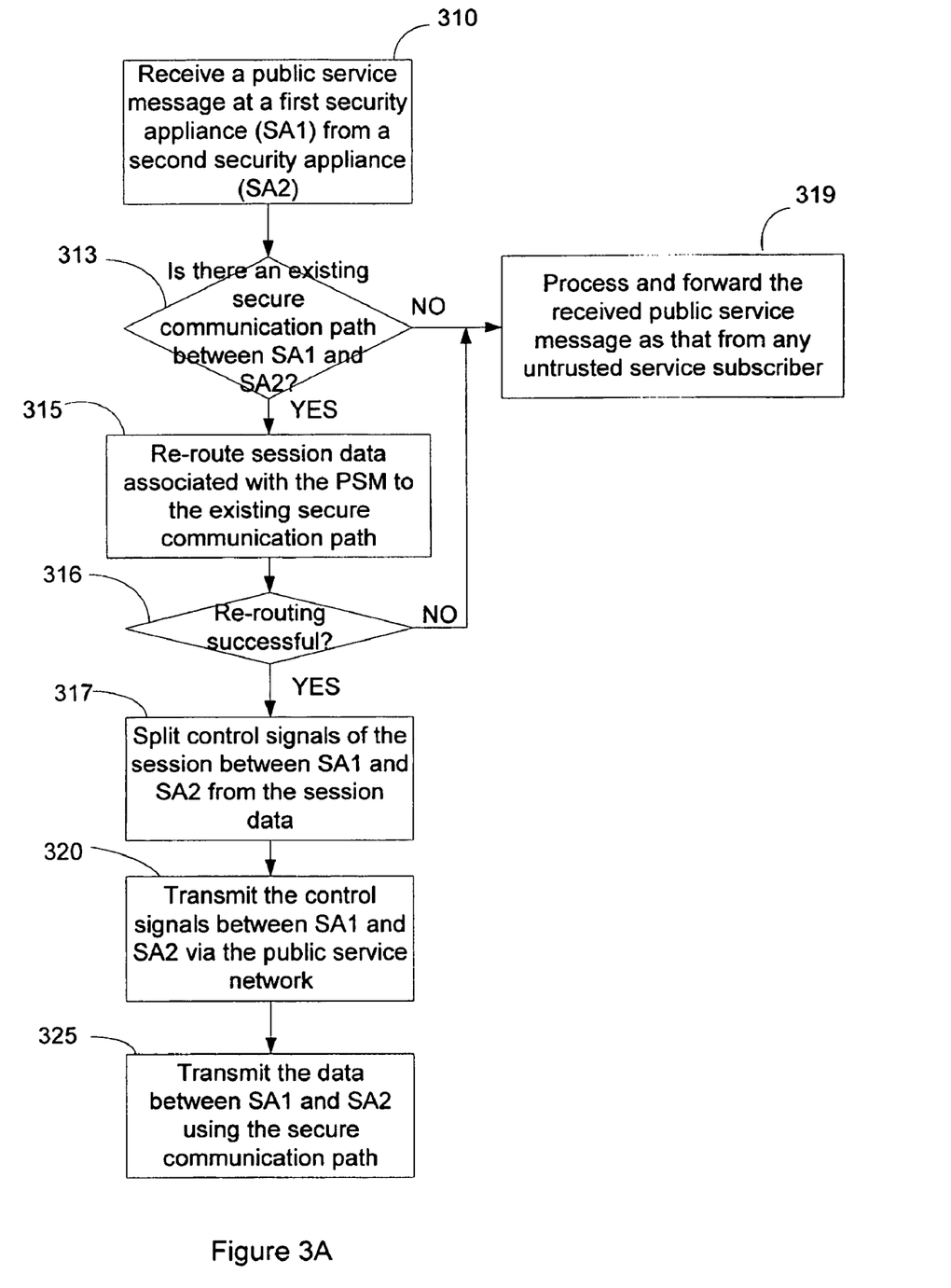
FIG. 3A illustrates a flow diagram of one embodiment of a process to perform dynamic secure re-routing of data flows for public services.

FIG. 3A shows a flow diagram of one embodiment of a process to perform dynamic secure re-routing of data flows for public services. The process is performed by processing logic that may comprise hardware (e.g., circuitry, dedicated logic, etc.), software (such as is run on a general-purpose computer system, a server, or a dedicated machine), or a combination of both.

Referring to FIG. 3A, the process begins when a public service message (PSM) is received at a first security appliance (SA1) from a second security appliance (SA2) (processing block 310). The PSM may have originated from a network device (also referred to as the initiator) coupled to SA2 and be destined to another network device (also referred to as the responder) coupled to SA1. The PSM may include a public service request or a public service response, such as a request or a response to establish a VoIP call between two Internet telephones coupled to SA1 and SA2, respectively. In response to the PSM received, processing logic checks whether there is an existing secure communication path between SA1 and SA2 (processing block 313). If there is no existing secure communication path between SA1 and SA2, in some embodiments, dynamic secure re-routing may not be performed. Hence, processing logic processes and forwards the received PSM as received from any untrusted service subscribers (processing block 319).

However, if there is a secure communication path already established between SA1 and SA2, processing logic may infer that the initiator and the responder are both trusted subscribers. Thus, the communication between SA1 and SA2 can leverage the established secure communication path between SA1 and SA2. To use the established secure communication path between SA1 and SA2, processing logic re-routes session data associated with the PSM to the existing secure communication path (processing block 315). Details of the re-routing process are discussed below with reference to FIGS. 3C-3E. Then processing logic checks whether the re-routing is successful (processing block 316). If the re-routing is not successful, processing logic processes and forwards the received PSM as received from any untrusted service subscribers (processing block 319). Otherwise, processing logic transitions to processing block 317.

After successfully re-routing the session data, processing logic splits control signals of a session between SA1 and SA2 from the data of the session (processing block 317). Then processing logic transmits the control signals between SA1 and SA2 via the public service network (processing block 320). In some embodiments, the control signals are sent to a public server (e.g., the public server 140 in FIG. 1) via the public network and then sent to SA2 from the public server via the public network. The public server may control the connection between SA1 and SA2. Some examples of the tasks performed by the public server include tracking addresses and availability of network devices (e.g., Internet telephones) coupled to SA1 or SA2, authenticating users, etc.

Referring back to FIG. 3A, processing logic transmits the data of the call between SA1 and SA2 using the secure communication path instead of the public service network (processing block 325). By using the secure communication path, unauthorized access to the data by untrusted subscribers may be prevented. In some embodiments, the data may be encrypted before being transmitted over the secure communication path to further protect the confidentiality of the data.

Figure 3B:
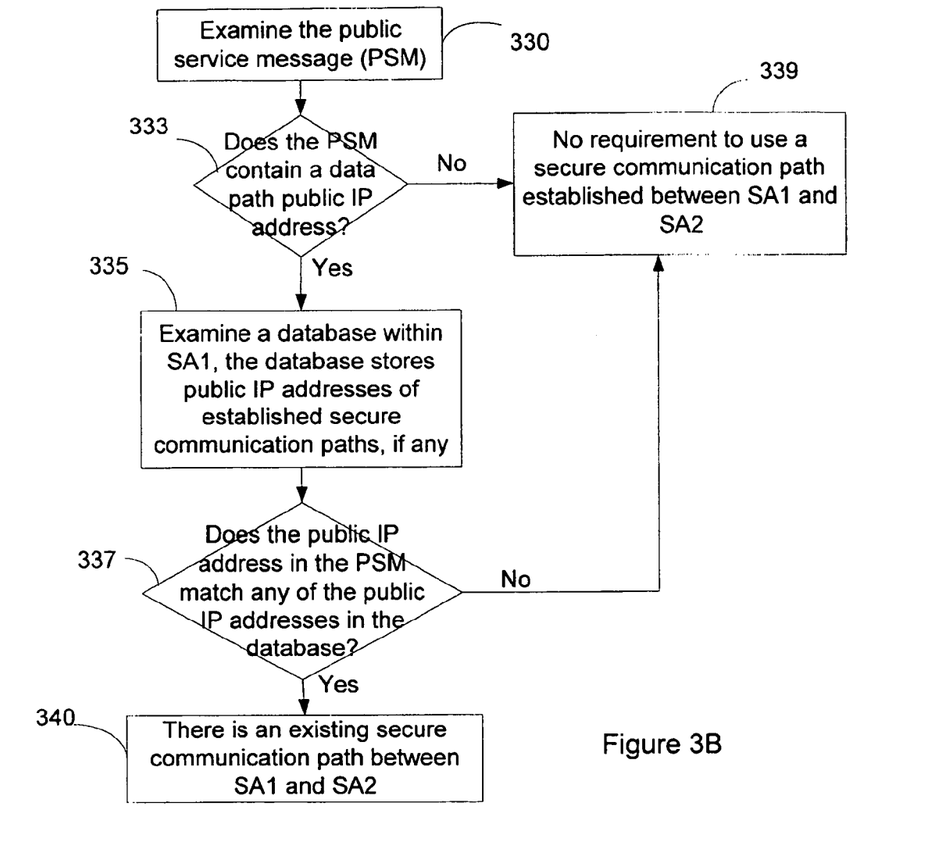
FIG. 3B shows a flow diagram of one embodiment of operations to process a public service message (PSM) received in order to determine whether a secure communication path exists between a first security appliance (SA1) and a second security appliance (SA2)

FIG. 3B shows a flow diagram of one embodiment of operations to process a PSM received in order to determine whether a secure communication path exists between a first security appliance (SA1) and a second security appliance (SA2). The process is performed by processing logic that may comprise hardware (e.g., circuitry, dedicated logic, etc.), software (such as is run on a general-purpose computer system, a server, or a dedicated machine), or a combination of both.

Processing logic examines the PSM received (processing block 330). Processing logic checks whether the PSM contains a data path public IP address (processing block 333). If the PSM does not contain any data path public IP address, then processing logic concludes that there is no requirement to use a secure communication path established between SA1 and SA2 (processing block 339). Without the need for data exchange over the secure communication path already established between SA1 and SA2, processing logic may not perform dynamic secure re-routing of data flows for public services.

However, if the PSM contains a data path public IP address, then there may exist a secure communication path between SA1 and SA2. In some embodiments, the PSM contains multiple public IP addresses. Processing logic examines a database stored in a storage device, such as the storage device 240 in FIG. 2 (processing block 335). The database may contain a list of public IP addresses of the established secure communication paths, if any. Processing logic then checks whether the public IP address in the PSM matches any of the public IP addresses in the database (processing block 337). If there is no match, processing logic concludes that there is no secure communication path established between SA1 and SA2 (processing block 339). Hence, processing logic may not perform dynamic secure re-routing of data flows for public services. However, if there is a match, processing logic concludes that there is an existing secure communication path between SA1 and SA2 (processing block 340).

Figure 3C:
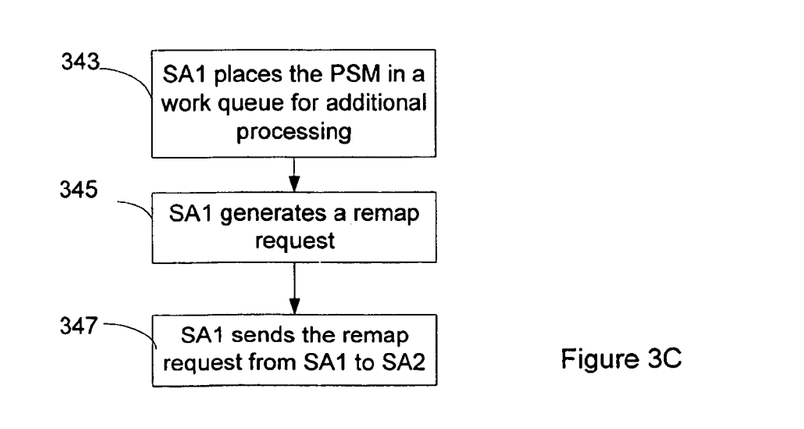
FIG. 3C illustrates a flow diagram of one embodiment of a process that SA1 performs to re-route to an existing secure communication path between SA1 and SA2.

FIG. 3C illustrates a flow diagram of one embodiment of a process that SA1 performs to re-route to an existing secure communication path between SA1 and SA2. The process is performed by processing logic that may comprise hardware (e.g., circuitry, dedicated logic, etc.), software (such as is run on a general-purpose computer system, a server, or a dedicated machine), or a combination of both.

Upon determining that there is an existing secure communication path between SA1 and SA2, SA1 places the PSM in a work queue for additional processing (processing block 343). Details of some embodiments of the additional processing are discussed below. Then SA1 generates a remap request (processing block 345) and sends the remap request from SA1 to SA2 (processing block 347).

In some embodiments, a remap request is a message defined by security appliances and is exchanged between the security appliances. A remap request may include a unique transaction identifier used for matching a remap response (details of which are discussed below with reference to FIG. 3D), details of the security appliance that is requesting IP address remapping, a list of one or more public IP addresses to be remapped, and details of the secure communication path that applies to the remapping request. When exchanged over a public communication path, the contents of the remap request may be encrypted using a key accessible to both SA1 and SA2 in order to protect the confidentiality of the exchange.

Figure 3D:
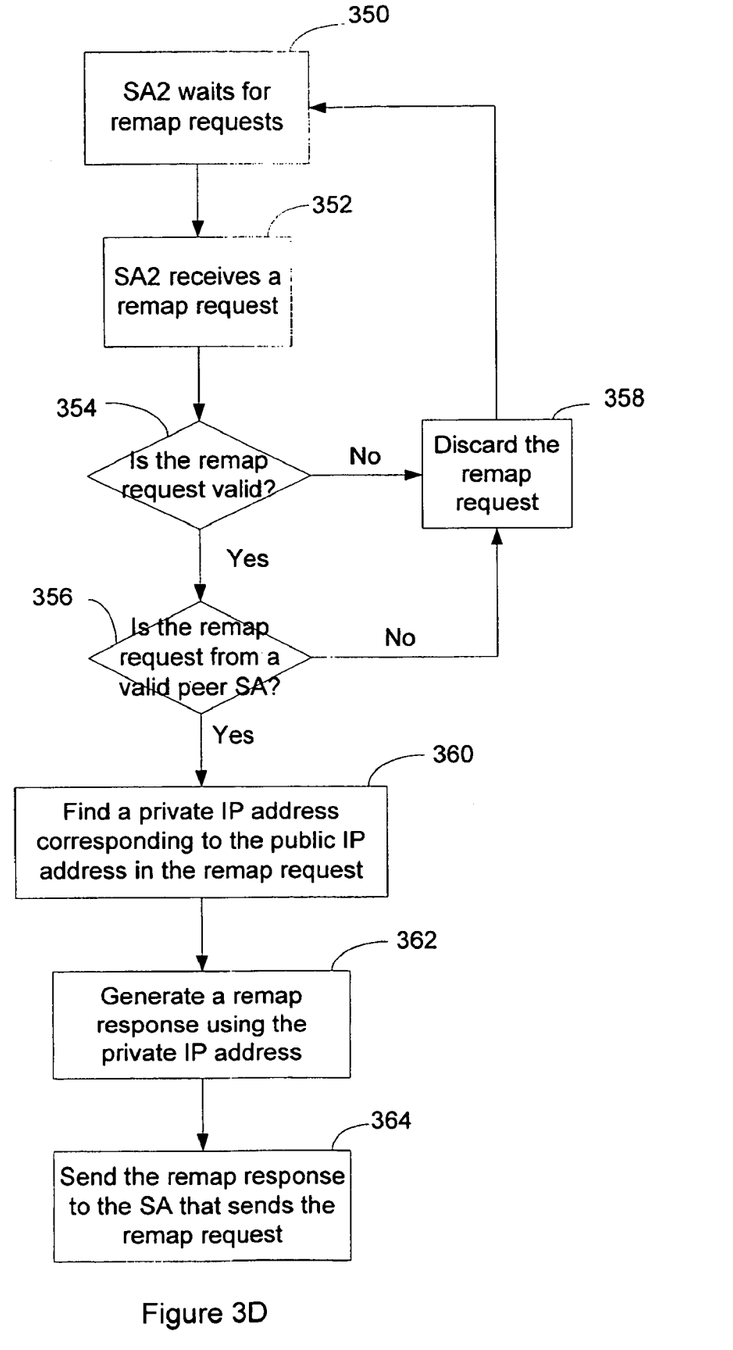
FIG. 3D shows a flow diagram of one embodiment of operations to process a remap request received from SA1 by SA2.

FIG. 3D shows a flow diagram of one embodiment of operations to process a remap request received from SA1 by SA2. The process is performed by processing logic that may comprise hardware (e.g., circuitry, dedicated logic, etc.), software (such as is run on a general-purpose computer system, a server, or a dedicated machine), or a combination of both.

Initially, SA2 waits for remap requests (processing block 350). Details of some embodiments of a remap request have been discussed above. When SA2 receives a remap request (processing block 352), processing logic checks whether the remap request is valid (processing block 354). If the remap request is invalid, processing logic discards the remap request (processing block 358). Otherwise, processing logic further checks whether the remap request is from a valid peer security appliance, i.e., whether SA1 is a valid peer security appliance (processing block 356). If not, then processing logic discards the remap request (processing block 358).

If the remap request is valid and is from a valid peer security appliance, processing logic finds a private IP address corresponding to a public IP address in the remap request (processing block 360). This is also referred to as the remapping of the public IP address. Then processing logic generates a remap response including the private IP address (processing block 362) and sends the remap response to the security appliance that sends the remap request, i.e., SA1 (processing block 364).

In some embodiments, a remap response is defined by security appliances and is exchanged between the security appliances in response to a matching remap request. A remap response may include a transaction identifier from the matching remap request and a list of private IP address mappings corresponding to the public IP addresses in the matching remap request. When exchanged over a public communication path, the contents of the remap response may be encrypted using a key accessible to both SA1 and SA2 in order to protect the confidentiality of the exchange.

Figure 3E:
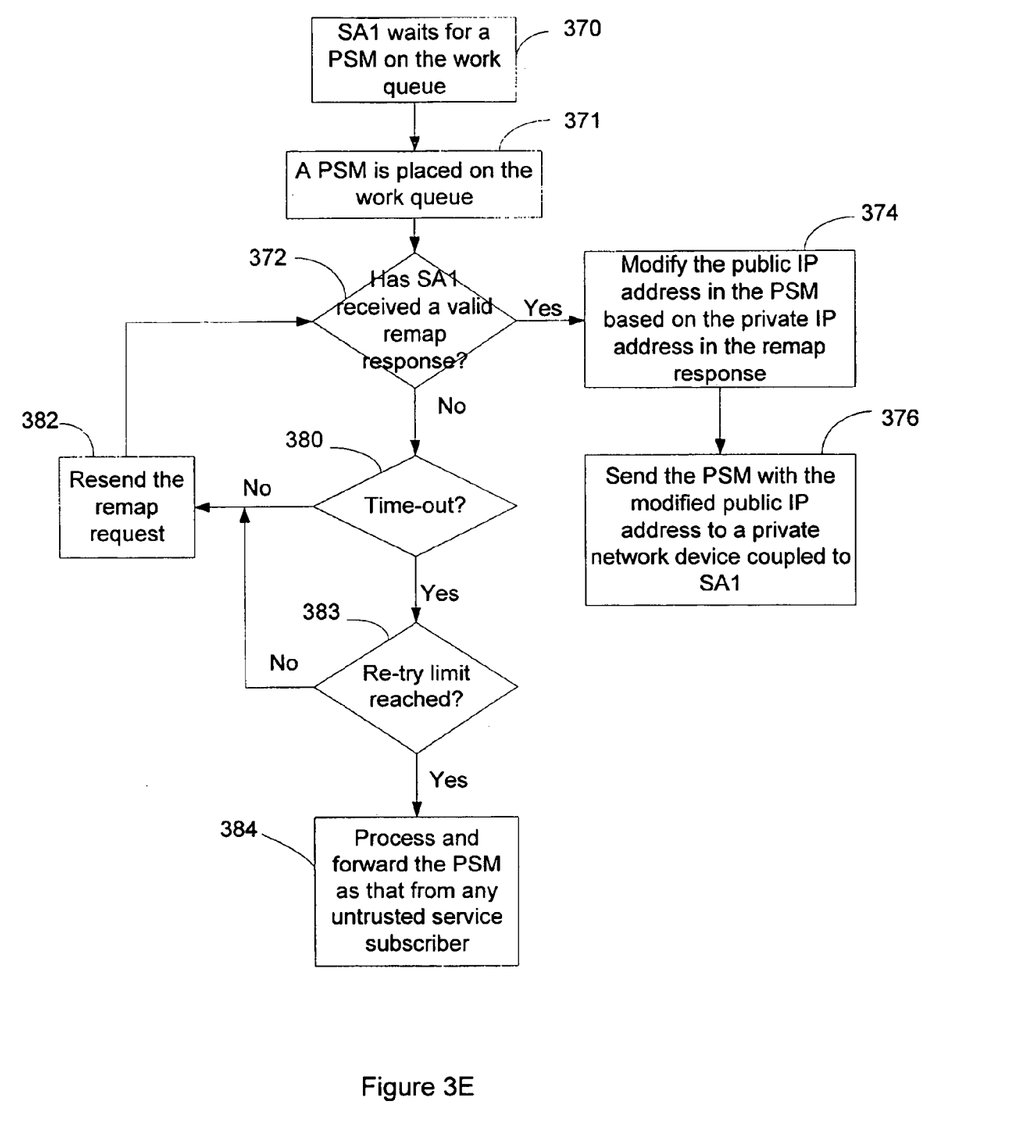
FIG. 3E illustrates a flow diagram of one embodiment of operations to process a remap response received by SA1 from SA2.

FIG. 3E illustrates a flow diagram of one embodiment of operations to process a remap response received by SA1 from SA2. The process is performed by processing logic that may comprise hardware (e.g., circuitry, dedicated logic, etc.), software (such as is run on a general-purpose computer system, a server, or a dedicated machine), or a combination of both.

Initially, SA1 waits for a PSM on a work queue, such as the work queue described above with reference to FIG. 3B (processing block 370). After a PSM is placed on the work queue (processing block 371), processing logic checks from time to time whether SA1 has received a valid remap response (processing block 372). If SA1 has received a valid remap response, processing logic modifies the public IP address in the PSM based on the private IP address in the remap response (processing block 374). In some embodiments, processing logic replaces the public IP address in the PSM with the private IP address. Then processing logic sends the PSM with the modified public IP address to a network device coupled to SA1 (processing block 376).

However, if SA1 has not received a valid remap response, processing logic may check whether time-out has occurred (processing block 380). If a time-out has occurred, processing logic determines whether a retry limit has been reached (processing block 383). If the retry limit not reached, processing logic may resend the remap request to the security appliance that sends the PSM, i.e., SA2 (processing block 382). Processing logic may then transition back to processing block 372 to wait for a valid remap response. However, if a time-out has occurred and the retry limit reached, processing logic may process and forward the PSM to the responder network device as that from an untrusted service subscriber (processing block 384).

By dynamically and securely re-routing session data to existing secure communication paths from public communication paths, public services can be used securely by trusted subscribers without implementing and maintaining some comparable communication services in-house. Thus, significant cost savings can be achieved. Furthermore, the above techniques provide secure communication even when trusted subscribers interact using the public services. Moreover, security is provided dynamically and transparently between the trusted subscribers. The trusted subscribers do not have to make any changes to accommodate the approach described above. In case the secure communication path fails, communication between the trusted subscribers may revert automatically to using the public communication paths provided by the public services. Thus, disruption in communication may be reduced.

To further illustrate the above techniques, one example of applying the above techniques to a VoIP system is described below with reference to FIG. 4. However, one should appreciate that the above technique is not limited to applications in VoIP. With some VoIP protocols (e.g., H.323, Session Initiation Protocol, Multimedia Gateway Control Protocol, Megaco, etc.), call signaling may use a separate User Datagram Protocol (UDP) stream or a Transmission Control Protocol (TCP) stream than that used for media exchange, such as Real-time Transfer Protocol (RTP). By registering with a public VoIP server, both trusted and untrusted subscribers can interact with one another. However, due to the public nature of VoIP service, public communication paths may still be used for signaling and data exchange according to some conventional approaches even when a secure communication path (e.g., a VPN tunnel) exists. By employing the technique described above, an existing secure communication path may be used instead of the public communication paths to transmit data.

Figure 4:
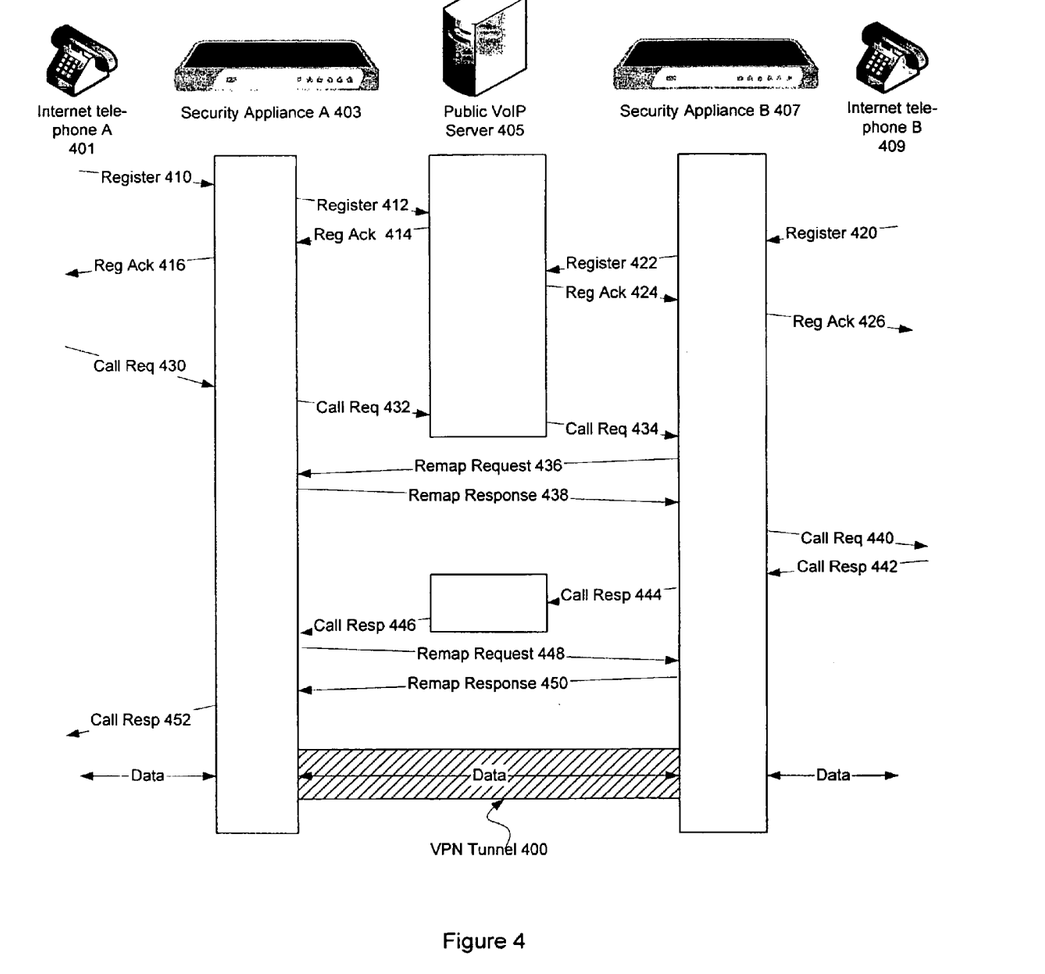
FIG. 4 illustrates a call diagram of one embodiment of a process to perform dynamic secure re-routing of data flows for Voice over Internet Protocol (VoIP) public service.

FIG. 4 illustrates a call diagram of one embodiment of a process to perform dynamic secure re-routing of data flows for VoIP public service. The components of one embodiment of a system supporting VoIP public service include an Internet telephone A 401, a security appliance A 403, a public VoIP server 405, a security appliance B 407, an Internet telephone B 409, and a VPN tunnel 400. The security appliances A 403 and B 407 may be coupled to the public VoIP server 405 via an Internet. Furthermore, the security appliances A 403 and B 407 may be coupled to each other via the VPN tunnel 400 as well. The system may adopt a topology substantially similar to the system 100 shown in FIG. 1. The network devices 113 and 123 may include the Internet telephones A 401 and B 409, respectively, the public server 140 may include the public VoIP server 405, the public service network 130 may include the Internet, and the secure communication path 135 may include the VPN tunnel 400.

In one embodiment, both Internet telephones 401 and 409 are trusted subscribers. According to one aspect of the invention, data exchange between the Internet telephones A 401 and B 409 may use the existing VPN tunnel 400 even though the public VoIP server 405 may not be aware that the VPN tunnel 400 exists. In some embodiments, data transmitted between the Internet telephones A 401 and B 409 via the VPN tunnel 400 is encrypted to protect the confidentiality of the data because the VPN tunnel 400 may traverse the Internet. However, data transmitted between one of the Internet telephones A 401 and B 409 and an untrusted subscriber may use the Internet and the data may not be encrypted.

Initially, the Internet telephone A 401 sends a register message 410 to the security appliance A 403 to register with the security appliance A 403. Then the security appliance A 403 sends a register message 412 to the public VoIP server 405 to register the Internet telephone A 401 with the public VoIP server 405. When the public VoIP server 405 has registered the Internet telephone A 401, the public VoIP server 405 sends a registration acknowledgement 414 to acknowledge the registration of the Internet telephone A 401 to the security appliance A 403. Then the security appliance A 403 sends a registration acknowledgement 416 to the Internet telephone A 401 to indicate that the Internet telephone A 401 has been registered with the public VoIP server 405.

Likewise, the Internet telephone B 409 may register with the public VoIP server 405 in substantially the same manner as the Internet telephone A 401. The Internet telephone B 409 sends a register message 420 to the security appliance B 407 to register with the security appliance B 407. Then the security appliance B 407 sends a register message 422 to the public VoIP server 405 to register the Internet telephone B 409 with the public VoIP server 405. When the public VoIP server 405 has registered the Internet telephone B 409, the public VoIP server 405 sends a registration acknowledgement 424 to acknowledge the registration of the Internet telephone B 409 to the security appliance B 407. Then the security appliance B 407 sends a registration acknowledgement 426 to the Internet telephone B 409 to indicate that the Internet telephone B 409 has been registered with the public VoIP server 405.

After both Internet telephones A 401 and B 409 have been registered with the public VoIP server 405, the Internet telephone A 401 may attempt to call the Internet telephone B. In some embodiments, the Internet telephone A 401 sends a call request 430 to the security appliance A 403. The security appliance A 403 may translate the signaling and RTP private IP addresses within the call request 430 into public IP addresses. Then the security appliance A 403 sends a call request 432 to the public VoIP server 405, where the call request 432 includes the public IP addresses from the security appliance A 403. In response to the call request 432, the public VoIP server 405 sends a call request 434 to the security appliance B 407 based on the public IP addresses.

In some embodiments, the security appliance B 407 examines the incoming call request 434 for public IP addresses. If a public IP address is found in the call request 434, the security appliance B 407 may compare the public IP address to the public IP addresses of the established secure communication paths, such as the VPN tunnel 400. If a match is found, the security appliance B 407 may generate a remap request 436 and send the remap request 436 to the security appliance A 403 via the Internet. The security appliance B may put the public IP address found in the call request 434 into the remap request 436. The remap request 436 is not routed through the public VoIP server 405.

When the security appliance A 403 receives the remap request 436, the security appliance A 403 generates a remap response 438 and put the private IP address of the Internet telephone A 401 into the remap response 438. Then the security appliance A 403 sends the remap response 438 to the security appliance B 407. The remap response 438 is not routed through the public VoIP server 405.

Upon receiving the remap response 438, the security appliance B 407 modifies the public IP address in the call request 434 based on the private IP address in the remap response 438. Then the security appliance B 407 sends the modified call request 440 to the Internet telephone B 409. The Internet telephone B 409 may accept the call request 440 and generate a call response 442. The Internet telephone B 409 may send the call response 442 to the security appliance B 407. In some embodiments, the security appliance B 407 translates the signaling and private IP addresses within the call response 442 into public IP addresses. Then the security appliance B 407 sends the modified call response 444 via the Internet to the public VoIP server 405. Then the public VoIP server 405 may send the call response 446 to the security appliance A 403.

When the security appliance A 403 receives the call response 446, the security appliance A 403 repeats substantially the same process performed by the security appliance B 407 described above to determine whether a secure communication path exists and to re-route the call. First, the security appliance A 403 examines the call response 446 for public communication path IP addresses. If a public IP address is found in the call response 446, the security appliance A 403 may compare the public IP address found to the public IP addresses of the established secure communication paths, such as the VPN tunnel 400. If a match is found, the security appliance A 403 may generate a remap request 448 and send the remap request 448 to the security appliance B 407 via the Internet. The security appliance 403 may put the public IP address from the call response 446 into the remap request 448. The remap request 448 is not routed through the public VoIP server 405.

Upon receiving the remap request 448, the security appliance B 407 generates a remap response 450 and puts the private IP address of the Internet telephone B 409 within the remap response 450. Then the security appliance B 407 sends the remap response 450 to the security appliance A 403 via the Internet. The remap response 450 is not routed through the public VoIP server 405.

When the security appliance A 403 receives the remap response 450, the security appliance A 403 may modify the public IP address in the call response 446 based on the private IP address within the remap response 450. Then the security appliance A 403 may send the modified call response 452 to the Internet telephone A 401. At this point, both Internet telephones A 401 and B 409 have each other's private IP addresses for exchanging data over the VPN tunnel 400. Thus, a call between the Internet telephones A 401 and B 409 over the VPN tunnel 400 can be established so that data of the call can be transmitted between the Internet telephones A 401 and B 409 over the VPN tunnel 400. Furthermore, the data transmitted over the VPN tunnel 400 may be encrypted to protect the confidentiality of the data. In some embodiments, the control signals of the call are exchanged between security appliances A 403 and B 407 via the public communication path during the call. The control signals of the call may still be transmitted over the Internet through the public VoIP server 405.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations described herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:
receiving a public service message associated with a session between a first and a second security appliances at the first security appliance from the second security appliance via a public network, the public service message being destined to a first network device coupled to the first security appliance, the public service message including one of a public service request and a public service response;
in response to the public service message, determining whether a secure communication path exists between the first and the second security appliances, wherein said determining whether the secure communication path exists comprises:
examining the public service message to determine if the public service message contains a first public Internet Protocol (IP) address, and
checking whether the first public IP address corresponds to the existing secure communication path if the public service message contains the first public IP address;
re-routing session data to the secure communication path if the secure communication path exists between the first and the second security appliances; and
if the secure communication path exists between the first and the second security appliances,
splitting control signals of the session from the data of the session to prepare for transmitting the control signals and the data of the session via different paths between the first and the second security appliances,
using the secure communication path to transmit data of the session without the control signals, and
transmitting the control signals without the data of the session via a non-secured communication path in the public network between the first and second security appliances.

2. The method of claim 1, wherein re-routing the session data to the secure communication path comprises:
sending a remap request to the second security appliance for the existing secure communication path if the first public IP address corresponds to the existing secure communication path, the remap request including the first Public IP address.

3. The method of claim 2, wherein re-routing the session data to the secure communication path further comprises:
receiving at the first security appliance a remap response from the second security appliance, the remap response including a private IP address corresponding to the first public IP address;
modifying the first public IP address in the public service message based on the private IP address in the remap response; and
sending the public service message with the modified first public IP address to the first network device coupled to the first security appliance.

4. The method of claim 2, wherein re-routing the session data to the secure communication path further comprises:
in response to the remap request, the second security appliance verifying that a second network device coupled to the second security appliance has a trusted relationship with the first network device; and
the second security appliance determining a private IP address corresponding to the first public IP address in the remap request; and
the second security appliance generating a remap response to be sent to the first security appliance, the remap response including the private IP address.

5. A machine-accessible medium that provides instructions that, if executed by a processor, will cause the processor to perform operations comprising:
receiving a public service message associated with a session between a first and a second security appliances at the first security appliance from the second security appliance via a public network, the public service message being destined to a first network device coupled to the first security appliance, the public service message including one of a public service request and a public service response;
in response to the public service message, determining whether a secure communication path exists between the first and the second security appliances, wherein said determining whether the secure communication path exists comprises:
examining the public service message to determine if the public service message contains a first public Internet Protocol (IP) address, and
checking whether the first public IP address corresponds to the existing secure communication path if the public service message contains the first public IP address;

re-routing session data to the secure communication path if the secure communication path exists between the first and the second security appliances; and if the secure communication path exists between the first and the second security appliances, splitting control signals of the session from the data of the session to prepare for transmitting the control signals and the data of the session via different paths between the first and the second security appliances, using the secure communication path to transmit data of the session without the control signals, and transmitting the control signals without the data of the session via a non-secured communication path in the public network between the first and second security appliances.

6. The machine-accessible medium of claim 5, wherein re-routing the session data to the secure communication path comprises:

sending a remap request to the second security appliance for the existing secure communication path if the first public IP address corresponds to the existing secure communication path, the remap request including the first Public IP address.

7. The machine-accessible medium of claim 6, wherein re-routing the session data to the secure communication path further comprises:

receiving at the first security appliance a remap response from the second security appliance, the remap response including a private IP address corresponding to the first public IP address;

modifying the first public IP address in the public service message based on the private IP address in the remap response; and sending the public service message with the modified first public IP address to the first network device coupled to the first security appliance.

8. The machine-accessible medium of claim 6, wherein re-routing the session data to the secure communication path further comprises:

in response to the remap request, the second security appliance verifying that a second network device coupled to the second security appliance has a trusted relationship with the first network device; and the second security appliance determining a private IP address corresponding to the first public IP address in the remap request; and the second security appliance generating a remap response to be sent to the first security appliance, the remap response including the private IP address.

9. An apparatus comprising:

a first interface to be coupled to a public network to receive a public service message associated with a session from a security appliance coupled to the public network, the public service message being destined to a network device, the public service message including one of a public service request and a public service response;

a second interface coupled to the first interface, the second interface to be coupled to the network device;

a processor coupled to the first and the second interfaces to determine whether a secure communication path exists between the first interface and the security appliance in response to the public service message and, if the secure communication path exists between the first interface and the security appliance, to re-route session data to the secure communication path, to split control signals of the session from the data of the session to prepare for transmitting the control signals and the data of the session via different paths between the first and the second security appliances if the secure communication path exists between the first interface and the security appliance, and to transmit data of the session using the secure communication path, and to transmit the control signals of the session between the first interface and the security appliance via the public network; and a storage device coupled to the processor to store one or more public Internet Protocol (IP) addresses of one or more existing secure communication paths coupled to the first interface, wherein the processor is operable to check a first public IP address in the public service message to determine whether the first public IP address matches any of the one or more public IP addresses in the storage device.

10. The apparatus of claim 9, wherein the processor is operable to send a remap request to the security appliance for the existing secure communication path if the first public IP address matches one of the on or more public IP addresses in the database, the remap request including the first public IP address.

11. A system comprising:

a first security appliance;

a second security appliance coupled to the first security appliance via a public service network; and a first network device coupled to the first security appliance, wherein the first security appliance comprises:

a first interface to be coupled to the public network to receive a public service message associated with a session from the second security appliance, the public service message being destined to the first network device, the public service message including one of a public service request and a public service response;

a second interface coupled to the first interface, the second interface to be coupled to the first network device;

a processor coupled to the first and the second interfaces to determine whether a secure communication path exists between the first and the second security appliances in response to the public service message and, if the secure communication path exists between the first and the second security appliances, to re-route session data to the secure communication path, to split control signals of the session from the data of the session to prepare for transmitting the control signals and the data of the session via different paths between the first and the second security appliances if the secure communication path exists between the first and the second security appliances, to transmit data of the session using the secure communication path, and to transmit the control signals of the session between the first and the second security appliances via the public network; and a storage device coupled to the processor to store one or more public Internet Protocol (IP) addresses of one or more existing secure communication paths coupled to the first security appliance, wherein the processor is operable to check a first public IP address in the public service message to determine whether the first public IP address matches any of the one or more public IP addresses in the storage device.

12. The system of claim 11, wherein the processor is operable to send a remap request to the second security appliance for the existing secure communication path if the first public IP address matches one of the one or more public IP addresses in the database, the remap request including the first public IP address.

13. The system of claim 12, wherein, in response to the remap request, the second security appliance is operable to verify that the first network device has a trusted relationship with a second network device coupled to the second security appliance, and if the first network device has the trusted relationship with the second network device, the second security appliance is operable to determine a private IP address corresponding to the first public IP address in the remap request and to generate a remap response to the first security appliance, the remap response including the private IP address.

14. The system of claim 13, wherein, in response to the remap response, the first security appliance is operable to modify the first public IP address in the public service message based on the private IP address in the remap response and to send the public service message with the modified first public IP address to the first network device.

15. The system of claim 11, wherein the first network device comprises an Internet telephone, the public service network comprises an Internet, and the secure communication path comprises a virtual private network (VPN) tunnel.

\* \* \* \* \*